3,257,490
PROCESS FOR PRODUCING FLAT DIMENSIONALLY STABLE, BIAXIALLY ORIENTED POLYPROPYLENE FILM
Ralph Allen Hovermale and James Gerken Rae, Orange, Tex., assignors to E. I. du Pont de Nemours and Company, Wilmington, Del., a corporation of Delaware
Filed Oct. 17, 1962, Ser. No. 231,214
3 Claims. (Cl. 264—289)

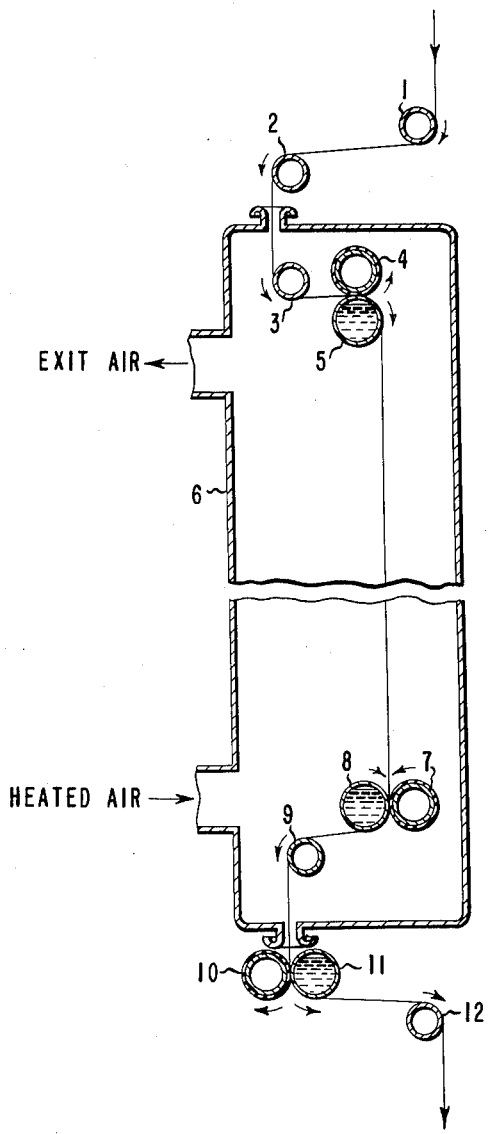

This invention is concerned with a process for producing highly durable polypropylene films having improved flatness and dimensional stability.

In the development of highly durable polypropylene films for a variety of uses, it is known to improve the strength characteristics of the films by stretching them at least in one direction and preferably in both the transverse as well as machine directions. While such a procedure leads to enhancement of various physical properties of the film, such a film has a tendency when exposed to somewhat elevated temperatures either during subsequent processing or under use conditions to retract toward the original dimensions prior to the stretching of the film. For some purposes heat shrinkability is desired but in many applications such behavior greatly interferes with the acceptability of films. For example, in heat sealing such a biaxially oriented polypropylene film there is considerable puckering of the film at the seals and an unsightly and unsatisfactory package results. Also, packages overwrapped with such films tend to distort and pucker when subjected to temperature changes. Also, such a biaxially oriented film when submitted to subsequent processing, for example, surface treating or coating, will undergo distortion in its dimension with the result that non-uniform and unsatisfactory processing occurs in these steps.

Still another important film characteristic is sheet flatness. It is found that sheet flatness is a highly essential requirement in a film to be processed satisfactorily or to be used in various commercial applications. Just as dimensional stability against changes with temperature is required in various processing steps such as surface treating and coating so also is sheet flatness important in assuring satisfactory sheet treatments in these processing steps. Further, lack of sheet flatness is extremely detrimental to satisfactory operation in bag making machines in the use on wrapping machinery and in printing presses and the like. It is at once evident that in order to provide a film which will be satisfactory for use in a variety of applications, it is essential that the film be not only highly durable but that the sheet must have dimensional stability against changes in temperature and that it must also have suitable flatness in order for it to be processed satisfactorily as well as being accepted in the various commercial applications of the trade.

Accordingly, it is an object of this invention to provide a process for producing a highly durable, dimensionally stable polypropylene film with satisfactory sheet flatness. It is a further object of this invention to provide a continuous process for producing a flat sheet of a biaxially oriented, dimensionally stabilized polypropylene film. The foregoing and related objects will more clearly appear from the description which follows.

These objects are fully realized by the process of this invention which, briefly stated, comprises in combination, the steps in sequence of (1) subjecting a biaxially oriented polypropylene film, which has been oriented by stretching from 2 to 10 times its original dimensions in the machine and transverse directions, to a heat treatment at a temperature in the range of from 120° C. to 150° C. for a time between 1 second and 10 seconds while permitting said film to retract between 10% and 30% in its transverse direction dimension and up to 15% in its machine direction dimension; and (2) thereafter stretching said film in the machine direction by an amount between 0.5% and 5% of its length while being maintained at a temperature between 100° C. and 150° C., whereby to produce a film having a sheet flatness, as measured by droop, of no greater than ¼ inch droop at one pound of tension per inch of film width, and a dimensional stability, as measured by shrinkage, of no greater than 5% shrinkage in either of the machine or transverse directions when heated at 130° C. for one minute.

Apparatus suitable for carrying out the process of this invention is illustrated diagrammatically in the single figure of the accompanying drawing. Referring to the drawing, biaxially oriented film F, fed continuously from a suitable source (not shown), e.g., from a supply roll or directly from the stretching operation, is passed over a series of idler rolls 1, 2 and 3, thence between two sets of positively driven nip rolls 4 and 5, and 7 and 8, housed in chamber 6, over idler roll 9, and finally through positively driven nip rolls 10 and 11 and over idler roll 12 disposed just outside of chamber 6. Nip rolls 4, 7 and 10 are preferably surfaced with elastomeric material. Nip rolls 5 and 8 are suitably heated and maintained at the desired temperature, while nip roll 11 is maintained at a temperature effective to chill the film passing through the nip provided by rolls 10 and 11. Heated air is passed through chamber 6 countercurrent to the travel of the film therethrough whereby to maintain the film at the desired predetermined temperature. The three sets of nip rolls are driven at relative speeds effective to permit the desired degree of relaxation of film passing between nip roll set 4–5, and nip roll set 7–8, and to thereafter stretch the film passing between nip roll set 7–8 and nip roll set 10–11.

As indicated above, the temperature at which the film is relaxed should be in the range of 120° C.–150° C. with temperatures around 140° C. being preferred. The amount of retraction in the transverse direction should be in the range of 10–30% with 20–30% being preferred; retraction in the machine direction should be from approximately 0–15% with the range of 5–10% being preferred.

With respect to the pullout or sheet flatness processing step following the strain relaxing step, best results are obtained at around 3% stretch in the machine direction, but this will depend considerably upon the condition of the sheet before being stretched. In general, amounts of stretch from about 0.5–5% are operable. Another important factor is temperature; best results are obtained at a stretching temperature around 140° C. However, under some conditions stretching can be done at a temperature as low as 100° C. and as high as 150° C. Again, the amount of stretch and the temperature of the film during the stretching step are interrelated and the amount of stretch as well as the temperature will be governed by the degree of improvement that has to be effected. If stretching is done at too high a temperature physical properties of the film are likely to be impaired; if at too low a temperature, little improvement in sheet flatness is realized.

In the preferred embodiment of this invention a polypropylene film, produced by extruding molten polypropylene in the form of continuous tubing, biaxially orienting by expanding and drawing the tubing, and slitting the tubing to form flat film, is submitted to a temperature of about 140° C. for about 5 to 10 seconds while about 25% retraction in the transverse direction is permitted and about 5–10% retraction in the machine direction. Following this, the strain-relaxed film, maintained at a temperature between 130° C. and 140° C., is stretched in the machine direction about 1–3% of its length. The resulting product has a sheet flatness as measured by droop, of no greater than ¼ inch droop at one pound of tension per inch of film width, and a dimensional stability, as measured by shrinkage, of no greater than 5% shrinkage in either of the machine or transverse directions when heated at 130° C. for one minute.

The following example illustrates the marked improvement in dimensional stability and sheet flatness to be realized by subjecting a film of biaxially oriented polyethylene film to the combination of steps which constitute the process of this invention.

A tube of polypropylene film which had been biaxially oriented by expanding the freshly extruded tube approximately 5 times its initial circumference (TD direction of the film) and by drawing the tube to 5 times its initial length (MD direction of the film) is slit into two sheets. One of these sheets is then fed through the equipment described above at such a rate and at such a temperature that relaxing in both the machine direction and transverse direction is realized. For the experiments summarized in the table below, the residence time of the film in the strain relaxing section was approximately 10 seconds at 140° C.; the amount of retraction allowed in the TD direction was 25%, the amount in the MD direction was 7%. To provide for improvement in sheet flatness the rolls corresponding to rolls 10 and 11 in the arrangement of apparatus described above were operated at a linear speed 3% faster than rolls 7 and 8. The temperature of roll 8 was held at 140° C. The resulting film showed a degree of flatness such that there was less than ¼ inch droop of any lane at a tension of one pound per inch of film width.

When there was no pull-up of the film after the strain relaxing step the sheet was not flat, showing a droop of more than ¼ inch at an even high tension of 1.4 pounds per inch of film width. Such film is unsatisfactory for use on automatic machines such as printing presses and bag making equipment.

The effect of these processing steps on dimensional stability, sheet flatness and physical properties is illustrated in the following table:

| | Control (No Strain Relax) | Strain Relaxed | MD Stretch 3% at 130° C. |
|---|---|---|---|
| MD/TD Shrinkage: | | | |
| (1 min. at 110° C.), percent | 3.8/12.5 | 0.3/1.7 | 1.8/2.2 |
| (1 min. at 120° C.), percent | 5.4/15.8 | 2.1/1.2 | 2.6/1.6 |
| (1 min. at 130° C.), percent | 7.2/22.4 | 3.4/3.6 | 4.2/4.7 |
| Sheet Flatness | Poor | Poor | [1] Good |
| Modulus×10³ MD/TD | 305/320 | 295/270 | 300/279 |
| Percent Elongation MD/TD | 84/136 | 139/160 | 91/165 |
| Tenacity×10³ | 24.0/21.5 | 26.2/16.5 | 27.7/16.6 |

[1] Less than ¼ inch droop at one pound tension per inch of film width.

With respect to these processing steps, it may be noted that while they improve the character of the film in respect to dimensional stability as well as sheet flatness there is little tendency for other desirable properties of the film to be sacrificed. For example, the stiffness, tensile and elongation properties of films which have been submitted to the heat relaxing steps described above essentially retain their desirable level of properties as illustrated in the table above. Further, films subjected to the strain relaxing step show no impairment in bag droop durability and actually show higher falling ball impact values. For example, one mil thick biaxially oriented and strain relaxed polypropylene film showed a falling ball impact value at 0° C. of 55.5 kg. cm., whereas a one mil control biaxially oriented film which had not been strain relaxed showed a comparable value of 39.5 kg. cm.

In the foregoing example, measurements of tensile strength, elongation and initial tensile modulus are made at 23° C. and 50% relative humidity. They are determined by elongating the film sample (samples are cut with a Thwing-Albert Cutter which cuts samples ¼ inch wide) in an Instron tensile tester at a rate of 100%/minute until the sample breaks. The force applied at the break in lbs./sq. inch (p.s.i.) is the tensile strength. The elongation is the percent increase in the length of the sample at breakage. Initial tensile modulus in p.s.i. is directly related to film stiffness It is obtained from the slope of the stress/strain curve at an elongation of 1%; both tensile strength and initial tensile modulus are based upon the initial cross-sectional area of the sample.

Sheet flatness is determined by stretching the film longitudinally across two carefully aligned, horizontal, parallel supporting bars or rolls 15 feet apart. The film ends are rigidly held and tension is applied longitudinally to the film over the upsupported span of 15 feet. The contour of a transverse section of the film at about the center of the unsupported span is observed and major departures from a straight, horizontal line are measured in inches.

The principal advantage of the practice of this invention is, of course, that one is enabled to produce a film which is not only highly durable but one which is dimensionally stable over a range of temperatures as well as having a degree of flatness which will insure good runability of such films in various kinds of processing equipment as well as subsequent converting equipment used in the trade.

We claim:

1. A process for improving the dimensional stability and sheet flatness of biaxially oriented polypropylene film which comprises, in combination, the steps in sequence of (1) subjecting a biaxially oriented polypropylene film, which has been oriented by stretching from 2 times to 10 times its original dimensions in the machine and transverse directions, to a heat treatment at a temperature in the range of from 120° C. to 150° C. for a time between 1 second and 10 seconds while permitting said film to retract between 10% and 30% in its transverse direction dimension and up to 15% in its machine direction dimension; and (2) thereafter stretching said film in the machine direction by an amount between 0.5% and 5% of its length while being maintained at a temperature between 100° C. and 150° C.

2. The process of claim 1 wherein said film is permitted to retract between 20% and 30% in the transverse direction, and between 5% and 10% in the machine direction.

3. A process for improving the dimensional stability and sheet flatness of biaxially oriented polypropylene film which comprises, in combination, the steps in sequence of (1) subjecting biaxially oriented polypropylene film which has been oriented by stretching about 5 times its original dimension in the machine direction and about 5 times in the transverse direction, to a heat treatment at a temperature of about 140° C. for a time between 5 and 10 seconds while permitting said film to retract about 25% in its transverse direction dimension and from 5% to 10% in machine direction dimension; and (2) thereafter stretching said film in the machine direction by an amount between 1% and 3% of its length while being maintained at a temperature between 130° C. and 140° C.

(References on following page)

References Cited by the Examiner

UNITED STATES PATENTS

| | | | |
|---|---|---|---|
| 2,884,663 | 5/1959 | Alles | 264—288 |
| 3,076,232 | 2/1963 | Dengler | 264—288 |
| 3,106,442 | 10/1963 | Compostella et al. | 264—290 |

FOREIGN PATENTS

| | | |
|---|---|---|
| 236,160 | 9/1959 | Australia. |
| 237,060 | 9/1959 | Australia. |
| 811,066 | 3/1959 | Great Britain. |

OTHER REFERENCES

Jack, "Biaxial Stretching of Polypropylene," British Plastics, vol. 34, No. 6 (1961), pp. 312 to 317, 391 to 394.

ALEXANDER H. BRODMERKEL, *Primary Examiner.*

ROBERT F. WHITE, *Examiner.*

K. W. VERNON, A. L. LEAVITT, *Assistant Examiners.*